E. B. ALLEN.
BUTTONHOLE CUTTING AND STITCHING MACHINE.
APPLICATION FILED AUG. 16, 1919.

1,360,704.

Patented Nov. 30, 1920.
5 SHEETS—SHEET 1.

WITNESSES:

INVENTOR
Edward B. Allen
BY Henry J Miller
ATTORNEY

E. B. ALLEN.
BUTTONHOLE CUTTING AND STITCHING MACHINE.
APPLICATION FILED AUG. 16, 1919.

1,360,704.

Patented Nov. 30, 1920.
5 SHEETS—SHEET 2.

E. B. ALLEN.
BUTTONHOLE CUTTING AND STITCHING MACHINE.
APPLICATION FILED AUG. 16, 1919.

1,360,704.  Patented Nov. 30, 1920.
5 SHEETS—SHEET 4.

WITNESSES:
Adrian DeMau
John F. Hing

INVENTOR
Edward B. Allen
BY Henry Miller
ATTORNEY

E. B. ALLEN.
BUTTONHOLE CUTTING AND STITCHING MACHINE.
APPLICATION FILED AUG. 16, 1919.

1,360,704.

Patented Nov. 30, 1920.
5 SHEETS—SHEET 5.

WITNESSES:

INVENTOR

UNITED STATES PATENT OFFICE.

EDWARD B. ALLEN, OF NEWTOWN, CONNECTICUT, ASSIGNOR TO THE SINGER MANUFACTURING COMPANY, A CORPORATION OF NEW JERSEY.

BUTTONHOLE CUTTING AND STITCHING MACHINE.

1,360,704.   Specification of Letters Patent.   Patented Nov. 30, 1920.

Application filed August 16, 1919. Serial No. 317,902.

*To all whom it may concern:*

Be it known that I, EDWARD B. ALLEN, a citizen of the United States, residing at Newtown, in the county of Fairfield and State of Connecticut, have invented certain new and useful Improvements in Buttonhole Cutting and Stitching Machines, of which the following is a specification, reference being had therein to the accompanying drawings.

Buttonhole cutting and stitching machines, as commonly constructed for clothing and shoe work, usually comprise an elongated hollow bed from the rearward end of which rises a standard carrying a forwardly extending bracket-arm beneath which and above the bed are disposed various moving parts of the buttonhole cutting and work-clamp operating mechanisms. In these machines the buttonhole cutting mechanism is so devised as to cut the buttonhole slit lengthwise of the machine bed, in order that the buttonholes may be formed at right angles to the edge of the work which, for convenience, is presented to the machine crosswise of and upon the forward or clear portion of the machine bed.

Certain classes of work, such as collars, can not be expediently handled by machines of the above type for the reason that, to be acceptable, the rear buttonhole of the collar must be arranged horizontally or with its slit parallel to the lower edge of the collar-band. The collar, therefore, cannot be laid across the forward or clear portion of the bed of a machine of the above type but would have to be arranged lengthwise of said bed and it would be difficult to safely dispose of the end of the collar extending into the space beneath the bracket-arm of the machine, since this space is largely filled up by moving parts of the work-clamp operating and buttonhole cutting mechanisms.

An object of the present invention is to provide a machine for cutting and stitching buttonholes in positions substantially parallel to the edge of the work, thereby particularly suiting the machine for cutting and stitching the rear buttonholes of collars.

A further object of the invention is to provide a machine for cutting and stitching a so-called "gap" buttonhole, that is, one wherein a narrow strip of material has been removed to form the buttonhole-slit, whereby a gap or space is provided between the opposed edges of said slit.

In buttonhole machines it is common to provide a needle-throat or "button," the upper surface of which is substantially flush with the upper surface of the usual work-supporting plates, which latter are cut away to admit the button and provide clearance therefor as the work-holder and sewing mechanisms are given their relative movement to sew around a buttonhole.

In machines of the type which cut the buttonhole in stitching position, it is customary to tilt or shift the needle-throat forwardly to avoid interference with the cutting instrumentalities. In machines of another type, which cut the buttonhole out of stitching position, it is customary to displace the work-holder rearwardly prior to the advance of the cutting implements. In machines of either of the above types the work-supporting plates are usually cut away in front of the stitching point so that the relative movement between the throat-plate and work-clamp, prior to cutting, may be effected.

This cutting away of the work-supporting plates in front of the sewing point necessarily removes the support from the material at the front end of the buttonhole slit and, consequently, when the usual work-clamping feet are lowered, the work is not clamped at the front end of the buttonhole slit although it is securely gripped along the sides and rearward end of said slit. Whether or not the work is clamped at the extreme front end of the buttonhole slit is relatively unimportant as long as the material at the sides of the slit is securely gripped.

If, however, a machine of one of the prior types is adapted to cut the buttonhole crosswise of the machine bed, a cutting away of the work-supporting plates forwardly of the sewing point would be highly disadvantageous as such action would then remove the support for the material at the front side of the buttonhole-slit, and as a result, the work would not be securely clamped and defective stitching would result along one side of the buttonhole.

A further object of the invention is to provide for the supporting and secure clamping of the work at the sides of the buttonhole-slit, during both the cutting and sewing operations, in a machine adapted for stitching buttonholes disposed substantially parallel to the edge of the work or crosswise of the machine bed.

Further, the invention has for an object to provide for the disposal of the cuttings or punchings so that none of the various mechanisms of the machine will become clogged.

Still further, the invention has for an object to provide the machine with a gap buttonhole cutter of simplified and improved construction, the cutting elements of which are provided with adjustments so that they may be readily removed for sharpening and replaced in correct operative position relative to the sewing instrumentalities.

To the attainment of the above and other objects, as will hereinafter appear, the invention is preferably embodied in a buttonhole cutting and stitching machine of the type represented in my Patent No. 1,162,207, of November 30, 1915. According to the present improvement the work is presented crosswise of the machine bed, as usual, and is clamped in stitching position. To effect the cutting of the buttonhole in the least possible time, the workholder and cutter-levers are preferably shifted substantially simultaneously in opposite directions and thus caused to meet each other substantially half way at a point displaced from stitching position. In other words, the work-holder is shifted rearwardly toward the cutters and, at the same time, the cutters are shifted forwardly toward the work-holder so that the two meet at a given cutting position intermediate stitching position and the normal retracted position of the cutting elements.

In the present instance the cutting elements comprise a punch cutter in the form of a thin blade curved flat-wise so as to be concentric with the fulcrum of its supporting lever and adapted to coöperate with a die having a narrow gap to receive the extremity of the cutter-blade. The punch and die elements are so arranged on their respective supporting levers as to punch out a narrow strip of material crosswise of the machine bed and thus cut the buttonhole gap or slit substantially parallel to the edge of the work.

To avoid the necessity of cutting away the work-supporting plates of the work-clamp to clear the needle-throat or "button" during the movement of the work-holder to cutting position, provision is made in the present instance for relatively moving the work-holder and needle-throat vertically to secure a vertical displacement between the work-holder and needle-throat permitting the work-holder and the cutter to assume cutting relation. In the present embodiment of the invention this relative vertical movement between the work-holder and needle-throat is provided for by lifting or tilting the work-holder upwardly so as to clear the needle-throat as the work-holder is being shifted to cutting position; the work-holder being provided with an aperture in advance of the usual sewing aperture to clear the needle-throat while the buttonhole is being cut. This last aperture, however, is not connected with the sewing aperture and the latter is accordingly entirely surrounded by work-supporting surface portions which coöperate with the upper work-clamping means to securely grip the work along the entire front and rear sides of the buttonhole-slit, as well as at the opposite end of said slit.

The feeding mechanism of the present machine includes the usual feed-wheel which, however, is preferably formed with but one feeding cam-groove designed to produce relative traveling or feeding movements between the stitch-forming mechanism and work-holder transversely only of the machine bed and therefore lengthwise of the buttonhole; the stitch-forming mechanism including sewing implements which are preferably disposed eccentrically to the axis of their usual supporting turrets, whereby during the rotation of the stitch-forming mechanism in stitching an end of the buttonhole slit the sewing implements are shifted crosswise of the gap and are in proper position for sewing along the other side thereof.

A better understanding of the invention may be had from the following detailed description taken in connection with the accompanying drawings, in which Fig. 2 is a horizontal section through the machine standard at an elevation above the bed and showing the latter as well as the work-holder and buttonhole cutting mechanism in plan. Fig. 2ª is a detail perspective view of the extremity of one of the upper work-clamping arms shown in Fig. 2. Fig. 3 is a fragmentary plan view of the lower work-clamping elements or work-supporting plates showing the stitching aperture and throat-plate clearance aperture with the intervening work-supporting surface portion.

In the preferred embodiment of the invention, as illustrated, the machine frame comprises the hollow rectangular base 1 from which rises the standard 2 of the bracket-arm 3 terminating in the hollow head 4.

The stitch-forming mechanism of the machine is preferably constructed substantially in accordance with the disclosure of my Patent No. 1,162,207, of November 30, 1915, and comprises an upper eye-pointed needle 5 which is carried by the needle-bar 6 journaled in the head 4 for the usual reciprocating and axial turning movements. The reciprocating movements are derived from the usual pitman 7 and crank-pin 8 at the forward end of the needle-bar actuating shaft 9 extending within and lengthwise of the bracket-arm 3. This shaft carries a bevel-gear 9ª which meshes with a companion gear 10 of twice its size fixed to the upper end of the vertical shaft 11 journaled within the standard 2 and at its lower end carrying a bevel gear 12 which meshes with the driving gear 13 on the main or sewing shaft 14 journaled within and lengthwise of the hollow base 1.

The needle 5 coöperates with the usual lower stitch-forming instrumentalities including the curved needle 15 carried by the usual rotary turret 15ª mounted to turn within the curb 16 about a vertical axis coincident with the axis of the needle-bar 6. During the sewing operation the needle-bar and turret receive simultaneous step-by-step turning movements from the upper and lower sector-gears 17 and 18, respectively. These gears are connected in the usual manner to a vertical shaft 19 to move in unison and are operated from the feed-wheel 20, all as more fully set forth in my said Patent No. 1,162,207, and in my pending application Serial No. 217,483, filed February 16, 1918.

Supported upon the turret 15ª is a post 21 carrying the usual needle-throat or button 22 which is formed with the usual crescent-shaped aperture 23 through the extremity of which the upper and lower needles are adapted to pass. Unlike the construction disclosed in my said Patent No. 1,162,207, the present support for the needle-throat is not mounted for tilting movement to permit the advance of the buttonhole cutter, but is rigid with the turret at all times.

The work-holder is of the usual traveling type which, however, in the present instance, receives only lateral components of motion from the said wheel 20. In other words, the present work-holder is moved crosswise only of the bed 1 during the sewing operation. While any suitable type of work-holder may be used, I prefer to employ a work-holder which, except for certain important modifications to be hereinafter described, is constructed substantially in accordance with the disclosure of my Patent No. 1,240,642, of September 18, 1917. Such a work-holder comprises a pair of lower clamping plates 24 which are removably mounted, as usual, upon the cross slide-plate 25. The cross slide-plate is formed at its forward extremity with spaced notches 26 which are entered by the shanks of the headed studs 27 depending from the lower work-supporting or clamping plates 24. Suitable spring catches 28 are utilized to retain the studs 27 in their respective notches 26 in the cross slide-plate.

At their rearward ends, the work-supporting plates 24 are held in operative position upon the cross slide-plate by means of the confining blocks 29 which are secured to the upper surface of a plate 33 which forms a part of the longitudinal slide-frame 30.

Figures 2, 2A, 3:
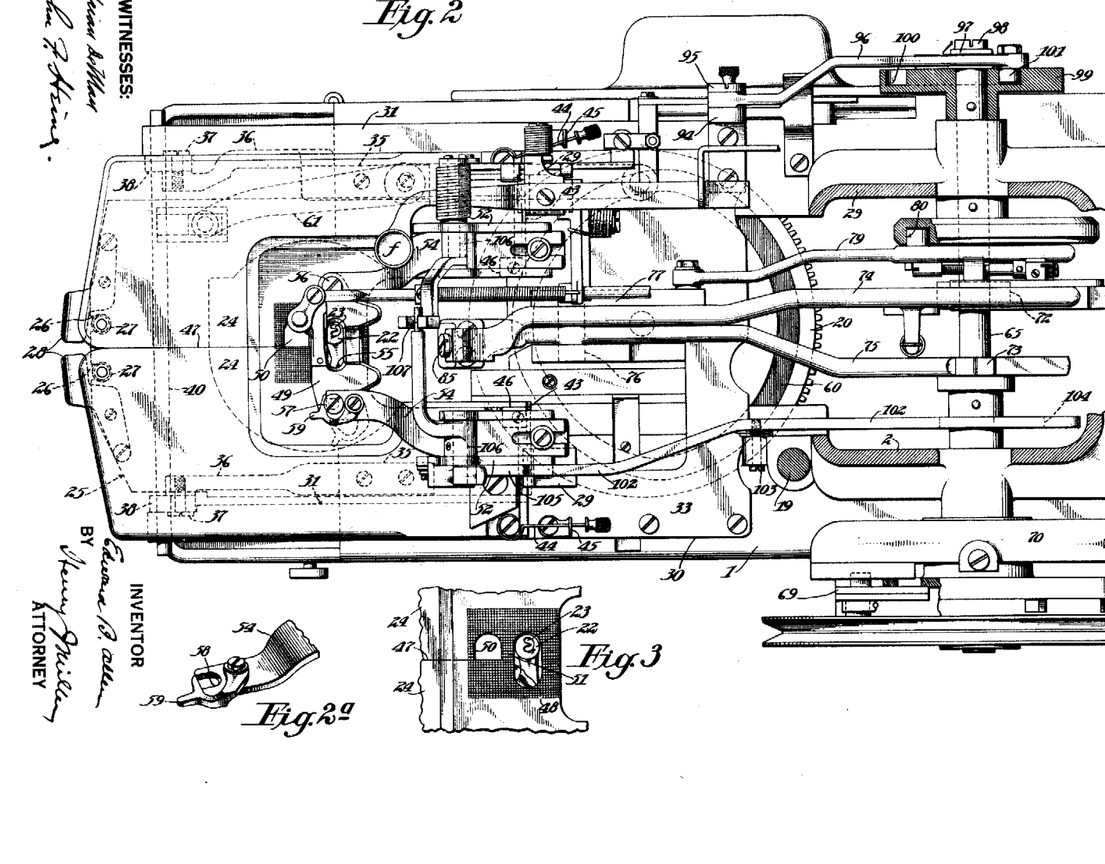
Figure 9:
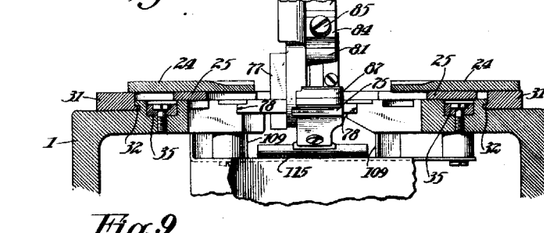
Fig. 9 is a detail view of the cutting mechanism showing the means for taking care of the cuttings.
Figure 10:
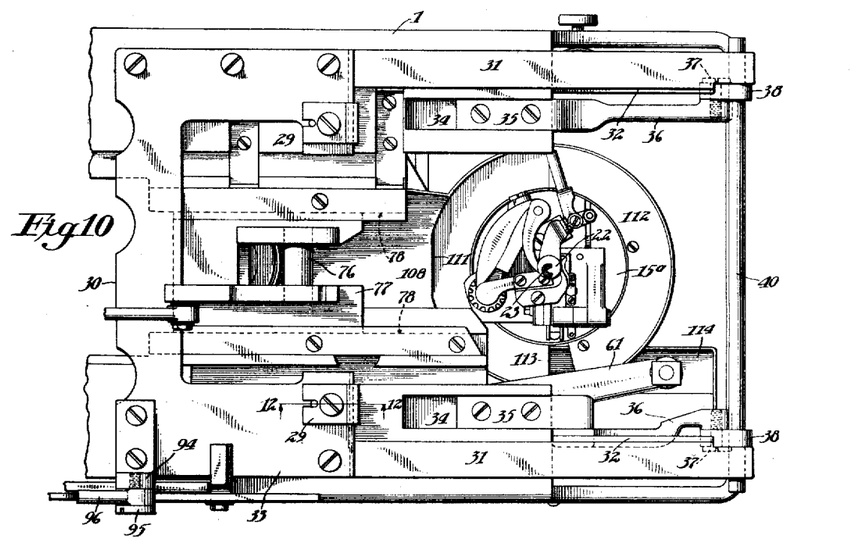
Fig. 10 is a plan view of the machine bed; the work-holder and cross slide-plate being removed.

Referring to Figs. 2, 9 and 10 it will be seen that the longitudinal slide-frame 30 comprises the side bars 31, 31 which are formed with ribs 32, 32, Fig. 9, fitted to corresponding undercut grooves on the bed 1. The bars 31 are connected at their rearward ends by the plate 33 which serves to hold the bars rigidly in parallel relation.

Rigidly secured within suitable depressions 34 in the bed 1 are the shanks 35 of the forwardly extending arms 36 to which are pivotally secured by screw-pins 37, 37, the lower ends of the links 38, 38 in the apertured upper ends of which are rigidly secured by set-screws 39 the cross slide-rod 40 the opposite extremities of which extend into the vertical slots 41 in the forward ends of the side bars 31 of the longitudinal slide-frame 30.

Figures 4, 5, 6:
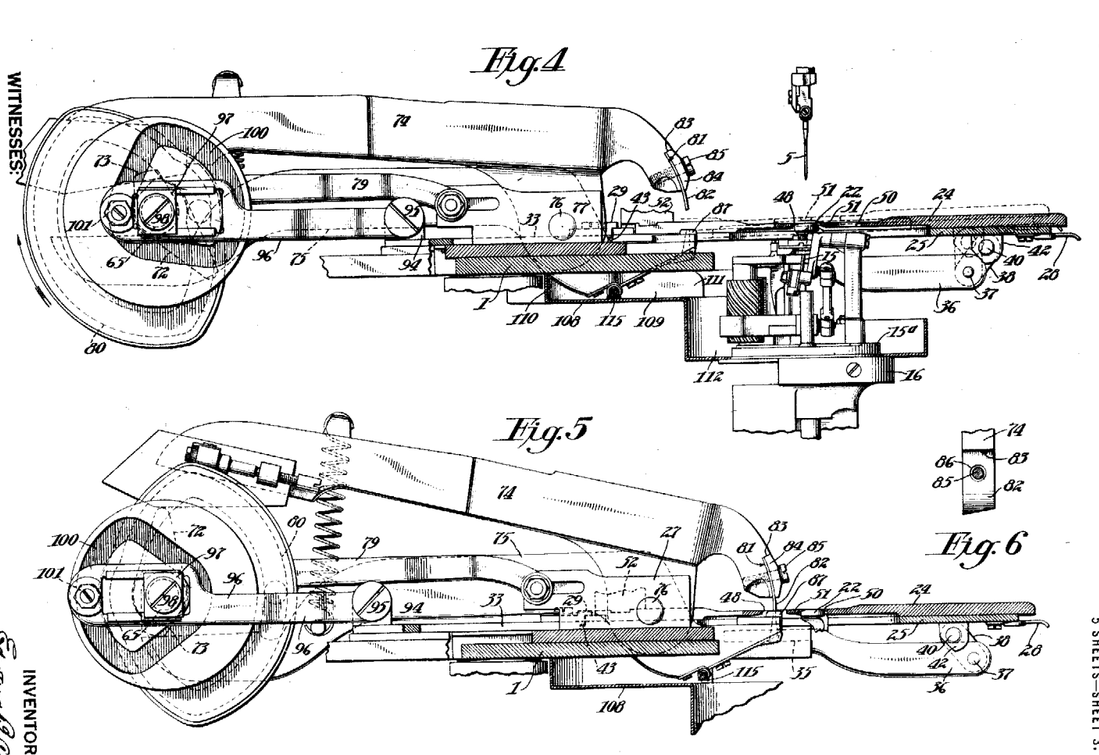
Fig. 4 is a left side elevation, partly in section, of the buttonhole cutting mechanism and work-holder in the position which they occupy during the sewing operation.
Fig. 5 is a similar view of the parts during the buttonhole cutting operation.
Fig. 6 is a detail front elevation of the upper cutting implement and its holder, the front clamping block being removed.
Figure 7:
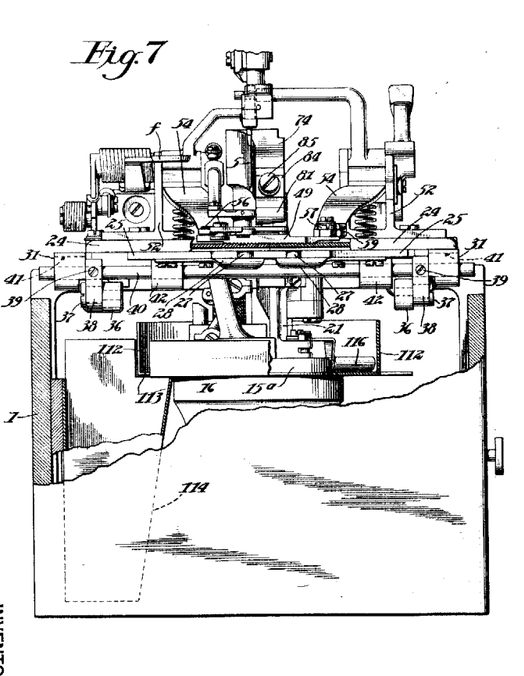
Fig. 7 is a front elevation, partly in section, of the machine bed and workholder.
Figures 11, 13, 15:
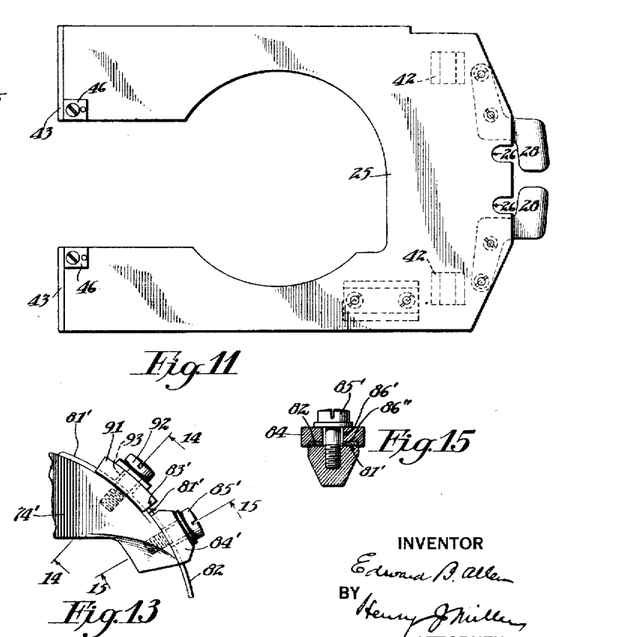
Fig. 11 is a plan view of the cross slide-plate.
Fig. 13 is a side elevation of a modified form of upper cutting element.
Fig. 15 is a section on the line 15—15, Fig. 13.
Figure 12:
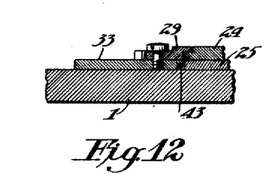
Fig. 12 is a section on the line 12—12, Fig. 10, but showing the cross slide-plate and one of the work-supporting plates in position upon the bed.

As shown in Figs. 4, 7 and 11, the cross slide-plate 25 is formed at its forward end with spaced depending lugs 42 which are apertured to receive and slide crosswise of the machine bed upon the rod 40. At its rearward end the cross slide-plate is thinned down to form tongues 43, 43, which slide along corresponding transverse undercut grooves at the forward edge of the plate 33. The usual springs 44, 44 which are carried by the work-supporting plates 24 and bear outwardly against the abutments 45, 45, on the plate 33 serve to maintain the rearward ends of the plates 24 in engagement with the stop-blocks 46 carried by the cross-slide-plate 25. No clamp spreading means are employed in the present construction.

The work-supporting plates 24 are formed in their meeting edges 47 with complemental notches affording an elongated aperture 48 extending crosswise of the bed 1 and transversely of the standard 2 and bracket-arm 3 of the machine frame. This aperture receives the needle-throat 22 during the sewing operation, as shown in Fig. 4, and consequently embraces the paths of movement of the upper and lower needles which pass through the extremities of the crescent-shaped aperture in the needle-throat. The aperture 48 in the lower clamp-plates has straight and uninterrupted front and rear sides along which the work is firmly clamped by means of the clamping foot 49. One of the work-clamping plates 24 is formed with an additional aperture 50 which is spaced forwardly of the aperture 48 and receives the needle-throat when the work-holder is shifted to cutting position, as shown in Fig. 5. This latter aperture is separated from the elongated aperture 48 by a tongue 51 which assists in supporting the work against the pressure of the clamping foot 49 and enables the work to be firmly clamped along the entire front side of the buttonhole-slit.

The lower clamping plates 24 carry the brackets 52 within which are fulcrumed at 53 the rearward ends of the usual upper clamping arms 54 which, in the present instance, carry at their forward ends the previously-mentioned clamping foot 49; the latter being formed with an elongated aperture 55, Fig. 2, extending crosswise of the bed 1 and adapted to register with the aperture 48 in the work-supporting plates 24. The under surface of the foot 49, being roughened, operates to securely clamp the work against the roughened upper surface adjacent the aperture 48 in the lower clamping plates.

The foot 49 is secured at one end to the forward extremity of one of the clamping arms 54 by the screw 56 and at its other end carries a screw 57 the shank of which is received within the notch 58 at the forward extremity of the other clamping arm and held therein by means of the pivoted latch 59. Upon opening the latch 59, the foot 49 may be swung about the screw 56 as a pivot to expose the needle-throat 22 and other parts stationed below said foot. It is to be understood that the screws 56 and 57 do not fit the apertures in the arms 54 so tightly as to prevent the foot from tilting slightly to accommodate itself to inequalities in the work and exert an even pressure thereon at opposite sides and ends of the buttonhole-slit.

It is understood that the feed-wheel 20 has in its upper surface a cam-groove 60 which operates through the usual lever connection 61, such as disclosed in my Patent No. 1,039,241, of September 24, 1912, to impart the necessary step-by-step feeding motion to the workholder crosswise of the machine bed 1. Step-by-step rotary motion is imparted to the feed-wheel through the usual gear connections 62, Fig. 1, with the star-wheel 63 which is driven by the diametrically opposed pins 64 at the lower end of the shaft 11, as more fully disclosed in my said copending application Serial No. 217,483.

The present machine preferably embodies an auxiliary shaft 65 which performs a single rotation prior to sewing, and another auxiliary shaft 66 which performs a single rotation subsequent to sewing. These shafts and the controlling connections therewith are preferably constructed substantially in accordance with the disclosure of my said copending application Serial No. 217,483; the first mentioned auxiliary shaft 65 will be recognized as the usual "cutter shaft" and is controlled by means of the usual driving and driven disks 67 and 68 and interposed clutch device 69 with clutch-controlling lever 70 pivoted on the machine frame at 71 for movement toward and away from the clutch device 69.

The cutter-shaft 65 carries the usual cams 72 and 73 which coöperate, respectively, with the rearward ends of the cutter-levers 74 and 75 to rock the latter about their common fulcrum 76 in the traveling fulcrum-block 77 mounted to slide longitudinally of the bed 1 in the usual ways 78 and receiving its traveling movement from the link 79 and usual cutter-advancing and retracting cam 80 on the cutter-shaft 65, all as disclosed in my Patent No. 1,048,786 of December 31, 1912.

The upper cutter-lever is formed at its forward end with a seat 81, Fig. 4, which is curved concentrically with the axis of the fulcrum-pin 76 for said lever. Fitted against this seat is the correspondingly curved thin blade 82, the upper end of which is squared off to abut against the shoulder 83 at the upper end of the seat 81. The blade 82 is clamped upon the seat 81 by means of the curved clamping block 84 and screw 85 which passes through an enlarged aperture 86 in the blade 82 and permits sidewise adjustment of said blade to insure that the buttonhole slit may be cut in a position such that one end of such slit is in exact registry with the path of the curved needle on its first ascent.

Figure 8:
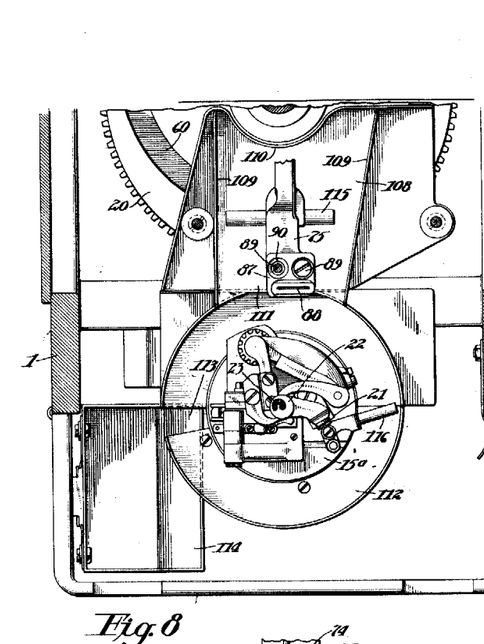
Fig. 8 is a plan view of the parts within the front end of the base of the machine adjacent the sewing point.

The blade 82 is adapted to act as a punch in coöperation with the die 87 having a slit like aperture 88 for reception of the lower end of the blade 82 and adjustably secured upon the forward extremity of the lower cutter-lever 75 by means of the screws 89, the shanks of which pass through enlarged apertures 90, Fig. 8, in the die 87. By virtue of the adjustments above described the cutter and die may be accurately registered to cut the buttonhole-slit or gap centrally of the stitched pattern produced by the stitch-forming mechanism.

Figure 14:
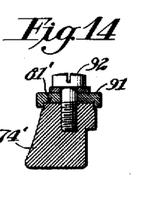
Fig. 14 is a section on the line 14—14, Fig. 13.

In the modified form of cutter illustrated in Figs. 13, 14 and 15, the upper cutter-lever 74' is formed with a curved seat 81' which, like the seat 81, is concentric with the fulcrum of its supporting lever. The curved blade 82 is clamped against the seat 81' by means of a clamping block 84' and screw 85' which passes through enlarged apertures 86', 86'', in the block and cutter-blade. The lever 74' supports a curved block 91 which is clamped to the surface 81' by means of the screw 92 which passes through the slot 93 in said block, permitting adjustment of the block lengthwise of the surface 81' to bring the shoulder 83' at the front or lower edge of said block into abutting relation with the squared off rearward end of the cutter-blade 82. When the blade 82 is replaced after having been removed for sharpening it may be adjusted to enter the die 87 the correct distance, after which the abutment block 91 is adjusted so as to engage and back up the upper end of the blade 82. The blade 82 being nothing more than a flat metal strip of uniform cross-sectional dimensions throughout its length, curved flatwise to the proper radius, is easily made up from strip stock and attached to the upper cutter-lever. As will be observed in Fig. 5, the cutters are advanced and closed to cut the buttonhole in a position displaced rearwardly from stitching position which in this figure is represented by the needle-throat 22.

In order that the work may be presented to the cutters and returned to stitching position, provision is made for shifting the work-holder rearwardly to cutting position, preferably simultaneously with the advance of the cutter-levers. Secured to the rearward left-hand corner of the longitudinal slide frame 30 is a post 94 to which is pivoted by the screw-pin 95 the forward end of a link 96 the slotted rear end of which embraces a block 97 mounted upon the screw-pin 98 which is concentric with the cutter-shaft 65. Lengthwise motion is imparted to the link 96 by means of the cam 99 on the cutter-shaft; said cam having a slot 100 which is entered by the follower roll 101 carried by the link 96.

When the work-holder is in stitching position, as shown in Fig. 4, the links 38 are inclined forwardly and upwardly, and the needle-throat 22 is received within the aperture 48 in the lower clamp-plates 24. Upon actuation of the cutter-shaft 65, rearward movement of the longitudinal slide-frame 30 causes the cross slide-rod 40 to be rocked rearwardly about the pivots 37, thereby elevating the cross slide-plate 25 and clamp-plates 24 as the links 38 move through the vertical position shown in dotted lines in Fig. 4. This elevation of the work-holder, during its rearward movement, lifts the tongue 51 clear of the needle-throat and prevents interference between these parts. It is, of course, understood that there is sufficient play between the rearward edges of the cross slide and work-supporting plates and their retaining means, to permit of the upward tilting movement above described.

The work-clamp may be closed by means of the usual clamp-closing lever 102 which is fulcrumed on the standard 2 at 103 and is actuated by means of the clamp-closing cam 104 on the cutter-shaft 65. At its forward end, the clamp-closing lever 102 is adapted to engage and depress the arm 105 carried by one of the usual alined shaft sections 106 of work-holders of the present type which, as is well known, embody the offset fork and pin connection 107 to cause the shaft sections 106 to turn in unison in closing and opening the clamp.

The machine is provided with the stop-motion s of well known construction and with the usual controlling mechanism for throwing the stop-motion to running position as the shaft 65 is completing its single rotation. The machine is also provided with mechanism for starting the second auxiliary shaft 66 when the stop-motion operates to stop the machine after the sewing is completed. These various devices are constructed substantially in accordance with the disclosure of my said application Serial No. 217,483, and as they are not claimed specifically herein further description thereof is believed to be unnecessary.

The machine is also preferably equipped with the thread-cutting mechanism disclosed in my copending application Serial No. 283,603, filed March 19, 1919, and with the finger-release mechanism for tripping the machine into action as disclosed in my copending application Serial No. 283,604, filed March 19, 1919. Such devices, however, form no part of the present invention.

In order to take care of the clippings which are punched from the material by the action of the cutter-blade 82 and die 87, the machine is preferably provided below the cutter-levers 75 with a sheet-metal trough 108 having side walls 109 and a rear end wall 110; the trough being open at its front end 111 below which is disposed a circular trough 112 surrounding the rotary turret 15ᵃ of the lower stitch-forming instrumentalities. The circular trough 112 is provided in its bottom wall with a discharge orifice 113 below which is situated the receptacle 114.

Secured to the lower cutter-lever 75 is a brush 115 which extends crosswise of and bears upon the bottom of the trough 109. During the advance of the cutter-levers, this brush operates to push into the circular trough 112 any clippings which may lodge in the trough 108. Similarly, the rotary turret 15ª carries a brush 116 which operates during the turning movement of the turret to sweep the clippings around the trough 112 until they fall through the discharge orifice 113 into the receptacle 114 from which they may be removed from time to time.

Figures 1, 16:
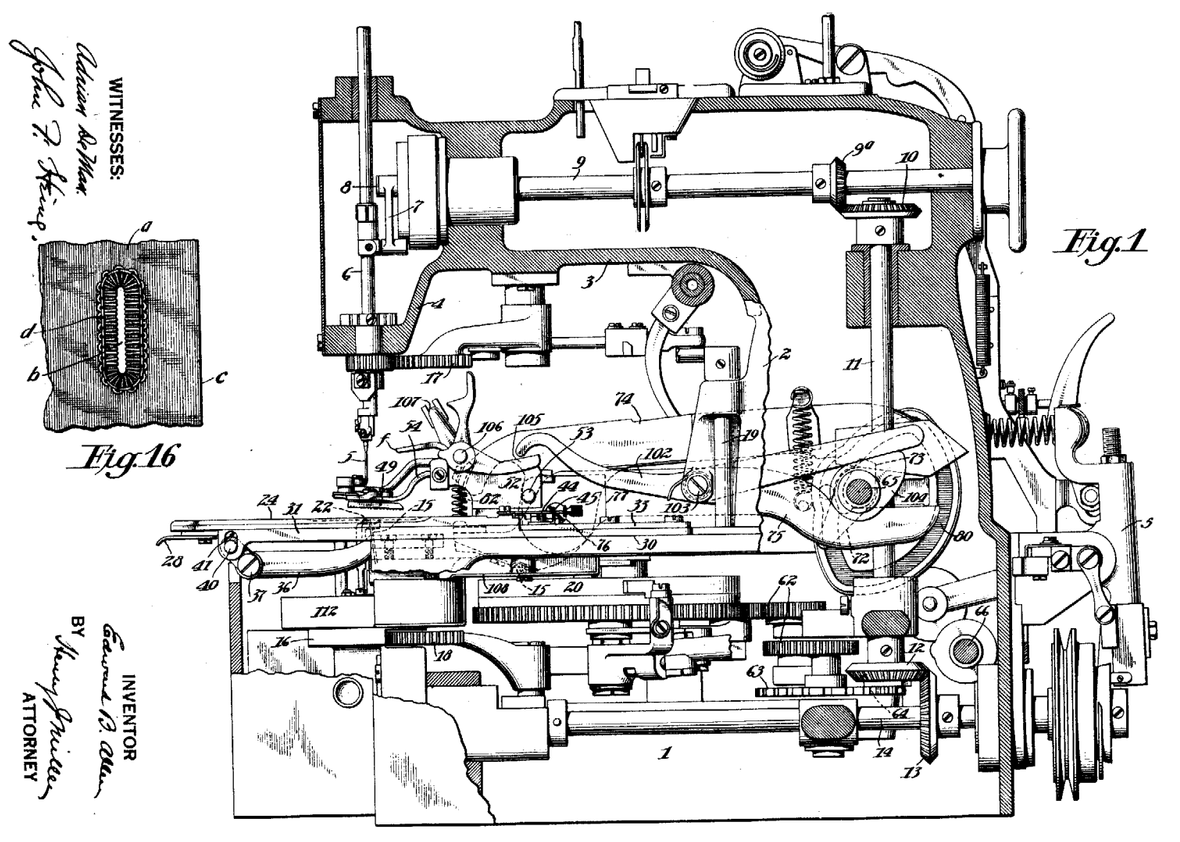
Figure 1 is a right side elevation of a machine embodying the invention in its preferred form; the frame being shown largely in section to reveal the internal mechanism.
Fig. 16 is a plan view of a gap-buttonhole such as produced by the present machine.

A sample of work, which the present machine is adapted to do, is shown in Fig. 16, wherein the body fabric *a* has gap or slit *b* extending substantially parallel to the edge *c* of the body fabric. The usual overseaming stitches *d* cover the raw edges of fabric at the gap *b*.

In the operation of the machine, the work is placed beneath the raised clamping foot 49, with the edge of the work lying crosswise of the bed 1, and the machine is started in the usual manner as by depressing the finger-piece *f*, which trips the cutter-shaft into action to perform its customary single rotation and then come to rest. During the rotation of the cutter-shaft, the clamp is closed and the work-holder retracted, the clamp-plates 24 being lifted clear of the needle-throat 22. The cutter-levers are advanced and closed to cut the buttonhole slit, whereupon the work-holder is returned to stitching position while the cutter-levers are being retracted to inoperative position, Fig. 4.

During the latter part of the single rotation of the cutter-shaft 65, the stitch-forming mechanism is tripped into action and as the stitching proceeds, the feed-wheel 20 operates to shift the work-holder step-by-step crosswise of the machine bed. When one side of the buttonhole has been stitched, the work-holder remains motionless while the supporting means for the stitch-forming mechanism partakes of a half rotation in placing the radial stitches about the end of the buttonhole. Upon completion of the second side and end of the buttonhole the stitch-forming mechanism comes to rest, the thread is cut and clamps are opened in any usual or suitable manner.

While I have shown and described a machine embodying the invention in its preferred form, it is to be understood that the present construction is susceptible of material modification, both in the form and arrangement of the various parts, within the scope of the invention.

Having thus set forth the nature of the invention, what I claim herein is—

1. In a buttonhole sewing machine, in combination, stitch-forming mechanism including a reciprocating needle and a needle-throat, a work-holder having an elongated aperture to admit the needle-throat during the sewing operation and including work-supporting surfaces at opposite sides of said aperture, a buttonhole slit cutter, feeding mechanism for relatively moving the stitch-forming mechanism and work-holder to sew around a buttonhole-slit, means for relatively moving the work-holder and buttonhole-cutter widthwise of said aperture to bring them into cutting relation, and means for relatively moving the work-holder and needle-throat vertically to secure the displacement of the needle-throat from the aperture in the work-holder prior to the cutting operation.

2. In a buttonhole sewing machine, in combination, stitch-forming mechanism including a reciprocating needle and a needle-throat, a buttonhole slit cutter, a work-holder having an elongated aperture for reception of said needle-throat and also having means adjacent said aperture for clamping the work along substantially the entire length of the buttonhole at both sides of the buttonhole-slit, feeding mechanism for producing relative movement between said stitch-forming mechanism and work-holder to sew around a buttonhole, and means for relatively moving said work-holder and needle-throat vertically and for relatively moving said work-holder and stitch-forming mechanism transversely of said aperture prior to the buttonhole cutting operation to permit the work-holder and buttonhole-cutter to assume cutting relation without interference with the stitch-forming mechanism.

3. In a buttonhole sewing machine, in combination, stitch-forming mechanism including a reciprocating needle and a needle-throat, a buttonhole slit cutter, a work-holder having an elongated aperture for reception of said needle-throat and also having means adjacent said aperture for clamping the work along substantially the entire length of the buttonhole at both sides of the buttonhole-slit, feeding mechanism for producing relative movement between said stitch-forming mechanism and work-holder to sew around a buttonhole, and means for relatively moving said work-holder and needle-throat vertically and for moving the work-holder in a direction transversely of said aperture prior to the buttonhole cutting operation to permit the work-holder and buttonhole cutter to assume cutting relation in a position spaced from stitching position.

4. In a buttonhole sewing machine, in combination, stitch-forming mechanism including a reciprocating needle and a needle-throat, a buttonhole slit cutter, a work-holder having an elongated aperture for reception of said needle-throat and also having means adjacent said aperture for clamping the work along substantially the entire length of the buttonhole at both sides of the buttonhole-slit, feeding mechanism for producing relative movement between said stitch-forming mechanism and work-holder to sew around a buttonhole, and means for lifting said work-holder clear of the needle-throat and for shifting said work-holder to cutting position in a direction transversely of said aperture.

5. In a buttonhole sewing machine, in combination, stitch-forming mechanism including a reciprocating needle and a needle-throat, a buttonhole slit cutter, a work-holder having an elongated aperture for reception of said needle-throat and also having means adjacent said aperture for clamping the work along substantially the entire length of the buttonhole at both sides of the buttonhole-slit, said work-holder being mounted for upward tilting movement about its rearward end as a fulcrum, feeding mechanism for producing relative stitch-positioning movements between said stitch-forming mechanism and work-holder to sew around a buttonhole, and means for tilting said work-holder upwardly about its rearward end as a fulcrum and for bodily shifting said work-holder in a direction transversely of said aperture prior to the buttonhole-cutting operation.

6. In a buttonhole sewing machine, in combination, stitch-forming mechanism including a reciprocating needle and a needle-throat, a work-holder apertured to receive the needle-throat, feeding mechanism for producing relative movement between the stitch-forming mechanism and work-holder to sew around a buttonhole, a buttonhole cutter and means for shifting the work-holder from stitching to cutting position, said means including mechanism for lifting the work-holder clear of the needle-throat.

7. In a buttonhole sewing machine, in combination, a frame including a bed, a standard rising from said bed and a bracket-arm carried by said standard and overhanging said bed, stitch-forming mechanism incorporated in said frame and including a reciprocating needle and a needle-throat, a work-holder having means for clamping the work throughout substantially the entire length of the buttonhole at opposite sides of the buttonhole-slit and also having an aperture elongated transversely of said standard and bracket-arm and adapted to receive the needle-throat during the stitching operation, a buttonhole-cutter normally remote from stitch-forming mechanism and adapted to cut the buttonhole-slit within and lengthwise of said aperture, feeding mechanism for relatively moving the stitch-forming mechanism and work-holder to sew around a buttonhole and means for relatively moving the work-holder and needle-throat vertically and for substantially simultaneously shifting the work-holder and buttonhole cutter toward each other to bring them into cutting relation intermediate stitching position and the normally retracted position of said cutter.

8. In a buttonhole sewing machine, in combination, a buttonhole-cutter, a work-holder, one or more pivotally mounted links inclined to the vertical for movably sustaining the forward end of said work-holder, and means for shifting the work-holder toward the buttonhole-cutter, whereby said links in rocking past the vertical position cause the forward end of the work-holder to be elevated during the movement to cutting position.

9. In a buttonhole sewing machine, a frame including a bed and an overhanging bracket-arm, a buttonhole cutter, a pair of arms rigidly secured to and projecting forwardly from said bed, forwardly and upwardly inclined links pivotally sustained at their lower ends by said arms, a work-holder disposed above said bed and having its forward end sustained by said links, said work-holder being free to slide transversely of said bed and bracket-arm without rocking said links, and means for shifting the work-holder rearwardly to cutting position, whereby said links cause the forward end of the work-holder to be elevated during the movement to cutting position.

In testimony whereof I have signed my name to this specification.

EDWARD B. ALLEN.